W. D. WERTS.
REAR AXLE CONSTRUCTION.
APPLICATION FILED JAN. 3, 1921.
1,408,152.
Patented Feb. 28, 1922.
3 SHEETS—SHEET 1.
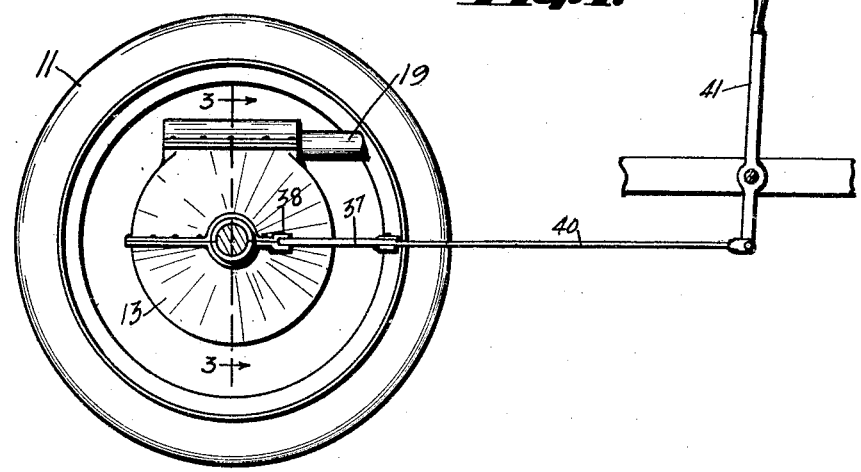
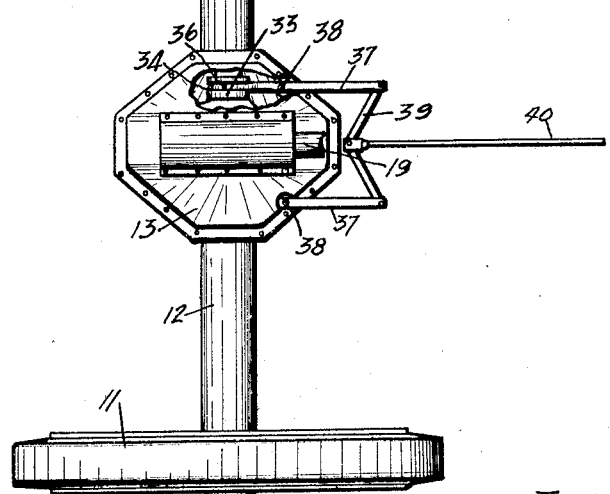
INVENTOR
William D. Werts.
by Hazard & Miller
ATTYS.

W. D. WERTS.
REAR AXLE CONSTRUCTION.
APPLICATION FILED JAN. 3, 1921.
1,408,152.
Patented Feb. 28, 1922.
3 SHEETS—SHEET 3.
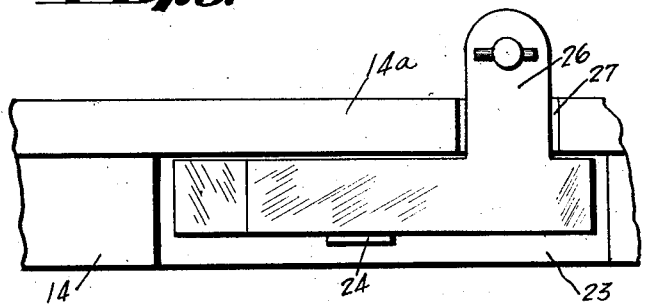
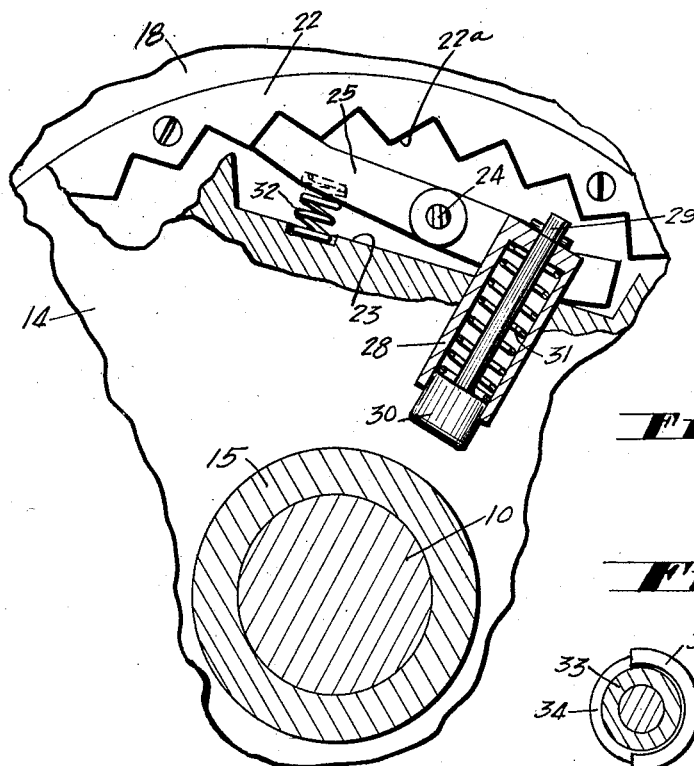
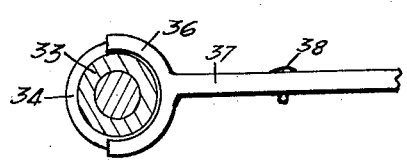
INVENTOR
William D. Werts.
by Hazard & Miller
ATTYS.

UNITED STATES PATENT OFFICE.

WILLIAM D. WERTS, OF LOS ANGELES, CALIFORNIA, ASSIGNOR OF ELEVEN PER CENT TO GEORGE FELDCAMP, ELEVEN PER CENT TO JOSEPH A. SHEARER, ELEVEN PER CENT TO CLAUDE E. GARNER, ELEVEN PER CENT TO CHAS. CALHOUN, AND ELEVEN PER CENT TO ROY MOORE, ALL OF LOS ANGELES, CALIFORNIA.

REAR-AXLE CONSTRUCTION.

1,408,152.      Specification of Letters Patent.      Patented Feb. 28, 1922.

Application filed January 3, 1921. Serial No. 434,779.

*To all whom it may concern:*

Be it known that I, WILLIAM D. WERTS, a citizen of the United States, residing at Los Angeles, in the county of Los Angeles and State of California, have invented new and useful Improvements in Rear-Axle Constructions, of which the following is a specification.

My invention relates generally to motor vehicles and more particularly to a rear axle and differential gearing therefor, and the subject matter herein disclosed is an improvement on the structure set forth in my co-pending application filed August 18, 1919, Serial No. 318,385.

The principal objects of my present invention are to generally improve upon and simplify the construction of the motor vehicle rear axle and differential gearing disclosed in my aforesaid application, as well as other existing types of similar devices, to provide a differential gearing that is entirely devoid of the usual beveled gears or pinions, and, further, to provide a differential gearing and axle construction that is composed of a minimum number of parts, thereby enabling the entire structure to be easily and cheaply produced and minimizing the expense of replacement or renewal of parts.

With the foregoing and other objects in view, my invention consists in certain novel features of construction and arrangement of parts that will be hereinafter more fully described and claimed and illustrated in the accompanying drawings in which:

Fig. 1 is an elevational view of the housing that encloses my improved differential gearing, and showing the hand lever and connections utilized for actuating parts of said gearing.

Fig. 2 is a plan view of a motor vehicle rear axle and differential gearing of my improved construction.

Fig. 5 is an enlarged detail view taken on the line 5—5 of Fig. 4.

Fig. 6 is an enlarged detail section taken approximately on the line 6—6 of Figure 3.

Fig. 7 is an enlarged detail section taken approximately on the line 7—7 of Fig. 3.

Figure 3:
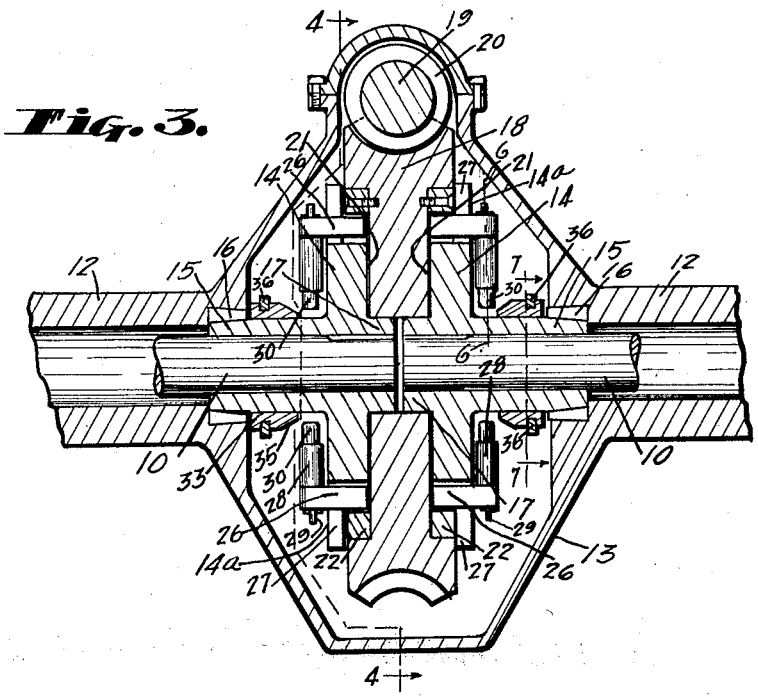
Fig. 3 is an enlarged vertical section taken approximately on the line 3—3 of Fig. 1.
Figure 4:
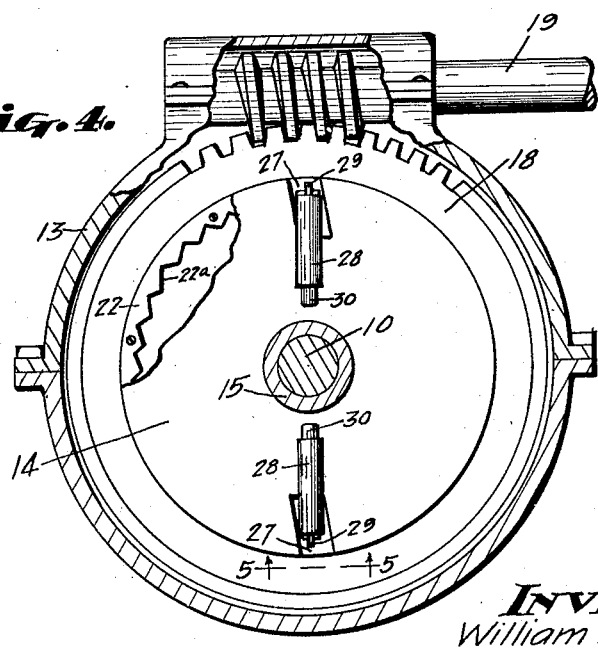
Fig. 4 is a vertical cross section taken approximately on the line 4—4 of Fig. 3.

Referring by numerals to the accompanying drawings which illustrate a practical embodiment of my invention, 10, 10 designate rear axle sections, each of which carries a wheel 11, and said sections extending through tubular housings 12, the inner ends of which are connected by a suitable differential gear housing 13, and which latter is preferably made in sections to facilitate assembly and installation of parts of the differential gearing.

Splined or keyed upon the inner ends of the axle sections 10 are discs 14 that are provided with outwardly projecting hub portions 15, and the outer ends of the latter are journaled in suitable anti-friction bearings 16 that are positioned in the sides of the housing 13, adjacent to the inner ends of the tubular members 12. The discs 14 are provided with relatively short, inwardly projecting hub portions 17, and arranged to rotate freely thereupon, and positioned between the discs 14 is a worm wheel 18. Journaled in suitable bearings in the top of housing 13 is the rear end portion of the motor or engine shaft 19, and positioned thereupon within said housing 13 is a worm 20 that engages the teeth of the worm wheel 18. Formed in the side faces of worm wheel 18 are recesses 21 for the accommodation of the inner portions of discs 14, and positioned in the outer portions of said recessses are rings 22, preferably of hardened metal, and having formed on their inner faces ratchet teeth 22$^a$ that are substantially triangular in shape and radially disposed so that their apices are inwardly presented. These rings are secured to worm wheel 18 in any suitable manner, preferably by means of pins or bolts.

Formed in each disc 14 and adjacent to the edge thereof is a pair of pockets 23, the members of which are disposed diametrically opposite to each other, and positioned in each pocket and fulcrumed upon a pin or bolt 24 that is arranged at an intermediate point in each pocket 23, is a pawl or dog 25, both ends of which are adapted to engage the adjacent ratchet teeth 22. The pin or bolt 24 is seated in a wall portion 14$^a$ of the discs 14 to the side of the pocket or recess 23 therein.

Formed integral with or fixed to each pawl or dog 25, and adjacent to one end thereof is a relatively short outwardly projecting arm 26, the same extending through an opening 27 that is formed in the adjacent wall portion 14a, and formed integral with the outer end of this arm 26 is a cylindrical member 28 that is radially disposed with respect to the axis of the axle members 10. Arranged to slide freely through the top or closed end of this cylinder 28 is a stem 29, the lower end of which carries a head 30 that normally projects a short distance below the lower end of cylinder 28, and arranged between this head and the closed end of the cylinder is a compression spring 31.

Arranged between the bottom of each pocket 23 and the pawl or dog 25 therein, and on the opposite side of the fulcrum or pivot point for said dog from the cylinder 28, is a relatively light compression spring 32 that normally exerts pressure to force the corresponding end of the pawl or dog into engagement with one of the ratchet teeth 22, (see Fig. 6).

Arranged for sliding movement on each hub member 15 is a collar 33 having an annular groove 34 formed therein, and the forward end of said collar is provided with a beveled face 35, that is adapted to engage beneath the outer faces of the adjacent pair of heads 30.

Positioned in the groove 34 in each collar is a yoke 36 that is formed on the inner end of a lever 37, the latter being fulcrumed at 38 upon the differential gear housing 13, and the outer ends of the two levers are connected by toggle links 39 to one end of a pull rod 40, the opposite end of the latter being pivotally connected to a hand lever 41 that is fulcrumed to a suitable support on the motor vehicle adjacent to the driver's seat.

The operation of my improved differential gearing is as follows:

As motor shaft 19 is operated, worm 20 will engage the teeth of worm wheel 18, thereby rotating the same, and this rotary motion will be transmitted to discs 14 and axle members 10, upon which said discs are fixed, by virtue of the engagement of the rear ends of pawl or dog 25 with the teeth 22a of rings 22, and which latter are fixed to worm wheel 18, it being understood that the springs 32 normally retain the rear ends of the pawl or dog in engagement with certain of the ratchet teeth 22a.

Thus, while the vehicle is travelling forwardly in a straight line, both wheel carrying sections 10 of the rear axle will be simultaneously driven, and, in the event that the vehicle turns laterally in either direction, the wheel on the one side of the turn, or the one making the shorter radius, will continue to perform the functions of a traction wheel, inasmuch as it is positively driven from the motor shaft, while the opposite axle section 10 and parts carried thereby will revolve at relatively greater speed, due to the increased travel of the outer wheel, or the one travelling on the greater radius, and during this action the point of the corresponding pawl or dog will slip past the ratchet teeth of the corresponding ring 22, thereby compensating for the different speeds of rotation of the two axle sections 10.

In the event that it is desired to drive the vehicle rearwardly, hand lever 41 is actuated so as to pull rod 40 and the inner ends of toggle links 39 forwardly, such action swinging levers 37 on their fulcrum, and consequently moving collar 33 inwardly, with the result that the beveled inner ends 35 of said collar will engage the under faces of heads 30, thereby swinging the pawls or dogs 35 upon their fulcrums so as to reverse their positions, it being understood that the springs 31, that are associated with stem 29 and heads 30, are relatively stronger or of greater tension than the oppositely arranged springs 32. When the positions of the pawls or dogs have been thus reversed, the operator manipulates the reverse lever of the machine control so as to reverse the direction of rotary motion of driving shaft 19, and, as a result, the worm wheel 18 will be reversely rotated, and through reversed dogs 25 will impart reverse motion to discs 14.

In the event that the vehicle is travelling down an incline or "coasting," dogs 25 may be shifted into reverse positions in the manner hereinbefore described, and, while so positioned, the weight of the vehicle can be utilized as the driving power, and with the gas supply cut off from the engine, the driving power of the weight of the vehicle will be resisted by the compression of air in the engine cylinders.

A rear axle and differential gearing of my improved construction is comparatively simple, can be easily and cheaply produced, is devoid of all bevel gears and pinions, is very flexible, and provides an efficient and substantial driving arrangement for the rear axles of vehicles.

It will be readily understood that numerous changes in the form, size and construction of the various parts of my improved rear axle and differential gearing may be made and substituted for those herein shown and described, without departing from the spirit of my invention, the scope of which is set forth in the appended claims.

I claim as my invention:

1. In a rear axle and differential gearing construction a pair of alined, wheel-carrying axle members, a power driven worm wheel mounted for rotation between said axle members, the side faces of which worm wheel are provided with annular rows of ratchet teeth, discs fixed on the axle pieces adjacent to the sides of the worm wheel, spring held dogs fulcrumed on said discs, a spring held actuating member carried by each dog, and means for engaging said actuating members to reverse the positions of said dogs.

2. In a rear axle and differential gearing construction, a pair of alined, wheel-carrying axle members, a power driven worm wheel mounted for rotation between said axle members, rings removaby applied to the side faces of said power driven wheel, said rings being provided on their inner faces with ratchet teeth, discs fixed on the inner ends of the axle pieces adjacent to the power driven wheel, spring held dogs fulcrumed on said discs, both ends of which dogs are adapted to engage the ratchet teeth on the adjacent rings, spring held actuating members carried by said dogs, and means for engaging said spring held actuating members to reverse the positions of said dogs.

3. In a rear axle and differential gearing construction, a pair of alined, wheel-carrying axle members, a power driven worm wheel arranged for rotation between said axle members, the side faces of said worm wheel being provided with annular rows of ratchet teeth, discs fixed on the axle pieces adjacent to the sides of the worm wheel, a plurality of dogs fulcrumed on each disc, springs arranged between said discs and said dogs for normally retaining the same in driving positions, a spring held actuating member carried by each dog, and means for engaging said spring held, actuating members to swing the dogs upon their fulcrums and reverse their positions.

4. In a rear axle and differential gearing construction a pair of alined, wheel-carrying axle members, a power driven worm wheel mounted for rotation between said axle members, the side faces of which worm wheel are provided with annular rows of ratchet teeth, discs fixed on the axle pieces adjacent to the sides of the worm wheel, spring held dogs fulcrumed on said discs, a spring held actuating member carried by each dog, means for engaging said actuating members to reverse the positions of said dogs, tubular members enclosing the axle members, and a housing connecting the inner ends of said tubular members and enclosing said worm wheel, discs and parts associated therewith.

5. In a rear axle and differential gearing construction, a pair of alined, wheel-carrying axle members, a power driven worm wheel mounted for rotation between said axle members, rings removably applied to the side faces of said power driven worm wheel, said rings being provided on their inner faces with ratchet teeth, discs fixed on the inner ends of the axle pieces adjacent to the power driven worm wheel, spring held dogs fulcrumed on said discs, both ends of which dogs are adapted to engage the ratchet teeth on the adjacent rings, spring held actuating members carried by said dogs, means for engaging said spring held actuating members to reverse the positions of said dogs, tubular members enclosing the axle members, and a housing connecting the inner ends of said tubular members and enclosing said worm wheel, discs and parts associated therewith.

6. In a rear axle and differential gearing construction, a pair of alined, wheel-carrying axle members, a power driven worm wheel arranged for rotation between said axle members, the side faces of said worm wheel being provided with annular rows of ratchet teeth, discs fixed on the axle pieces adjacent to the sides of the worm wheel, a plurality of dogs fulcrumed on each disc, springs arranged between said discs and said dogs for normally retaining the same in driving positions, a spring held actuating member carried by each dog, means for engaging said spring held, actuating members to swing the dogs upon their fulcrums and reverse their positions, tubular members enclosing the axle members, and a housing connecting the inner ends of said tubular members and enclosing said worm wheel, discs and parts associated therewith.

In testimony whereof I have signed my name to this specification.

WILLIAM D. WERTS.